United States Patent [19]

Tatara et al.

[11] 4,139,875

[45] Feb. 13, 1979

[54] CASSETTE AND CARD RECORDING AND/OR REPRODUCING APPARATUS

[75] Inventors: Shokichi Tatara, Sagamihara; Kenkichi Umeda, Tokyo; Hiroshi Takahashi, Yokohama, all of Japan

[73] Assignee: Sony Corporation, Tokyo, Japan

[21] Appl. No.: 845,672

[22] Filed: Oct. 26, 1977

[30] Foreign Application Priority Data

Nov. 25, 1976 [JP] Japan .............................. 51-141520

[51] Int. Cl.² ...................... G11B 25/04; G11B 25/06; G11B 25/10; G11B 15/16
[52] U.S. Cl. .................................... 360/94; 35/35 C; 360/2; 360/88; 360/130
[58] Field of Search .................. 360/94, 2, 88, 96, 90, 360/130; 35/35 C

[56] References Cited

U.S. PATENT DOCUMENTS

| | | | |
|---|---|---|---|
| 3,488,867 | 1/1970 | Lyon et al. | 360/2 |
| 3,584,882 | 6/1971 | Krtous | 35/35 C |
| 3,610,635 | 10/1971 | Schiff | 360/94 |
| 3,678,212 | 7/1972 | Wild | 360/94 |
| 3,763,330 | 10/1973 | Fulwiter | 360/94 |
| 3,799,421 | 3/1974 | McPherson et al. | 242/181 |
| 3,800,315 | 3/1974 | Budrose | 360/94 |
| 3,831,199 | 8/1974 | Vollum | 360/94 |
| 3,852,817 | 12/1974 | Budrose | 360/2 |

*Primary Examiner*—Alfred H. Eddleman
*Attorney, Agent, or Firm*—Lewis H. Eslinger; Alvin Sinderbrand

[57] ABSTRACT

In a cassette and card recording and/or reproducing apparatus; a housing is provided to receive a cassette with a run of the magnetic tape therein being coincident with a recording medium transport path, or to guide a card having a magnetic stripe affixed thereto so as to be disposed in said transport path, a head carriage is movable normal to the transport path and carries a magnetic head engageable with the magnetic tape or stripe in the transport path when the carriage is moved to an operative position, a pinch roller is mounted on the head carriage and cooperates with a rotated capstan for driving either the tape or card therebetween in the transport path upon movement of the carriage to its operative position, a tape guide member is urged to project into the transport path for guiding a tape in such path relative to the head in response to movement of the carriage to its operative position in the cassette mode of operation of the apparatus, and a mode change-over mechanism is selectively actuable for establishing the cassette mode of operation or the card mode of operation and includes a member which blocks the projection of the tape guide member into the transport path when the carriage is moved to its operative position in the card mode of operation.

11 Claims, 16 Drawing Figures

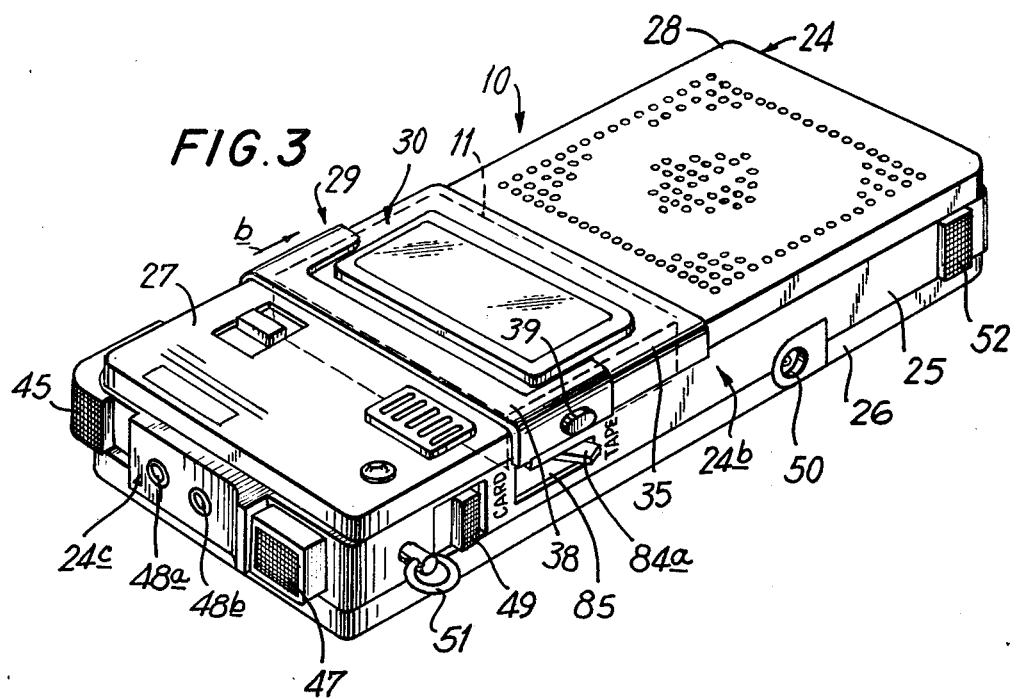
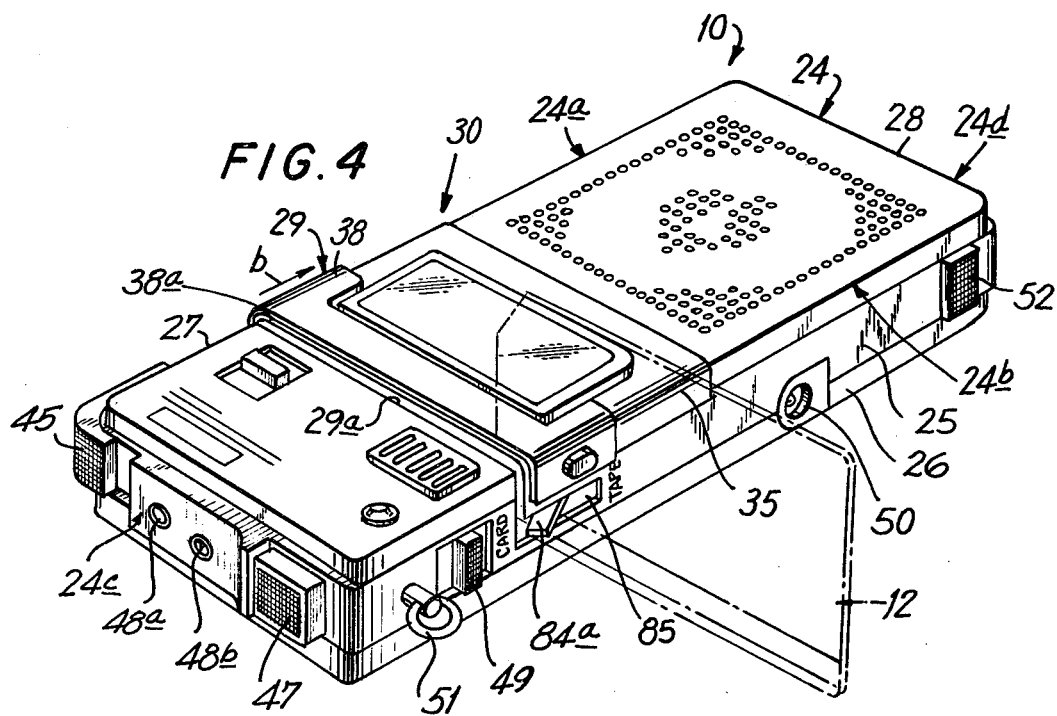

CASSETTE AND CARD RECORDING AND/OR REPRODUCING APPARATUS

BACKGROUND OF THE INVENTION

1. Field of the Invention

This invention relates generally to a magnetic recording and/or reproducing apparatus and, more particularly, is directed to an improved apparatus for recording and/or reproducing audio or other signals on a magnetic recording medium which is alternatively in the form of a magnetic tape within a cassette or in the form of a magnetic stripe or band affixed to a card.

2. Description of the Prior Art

Initially, individual devices have been provided for the recording and reproducing of audio or other signals on a magnetic tape contained in a cassette and on a magnetic stripe affixed to a cardboard or other substantially rigid card, respectively. Furthermore, adapters have been provided, for example, as disclosed in U.S. Pat. No. 3,610,635, and in U.S. Pat. No. 3,678,212, so that an apparatus primarily intended for recording and/or reproducing operations in association with a magnetic tape cassette can be adapted for use in recording or reproducing signals in a magnetic band or stripe on a linearly movable card. Although such adapters avoid the necessity of providing individual devices for use with the cassettes and cards, respectively, the use of an additional device or adapter is still troublesome. Accordingly, it has been proposed, for example, in U.S. Pat. No. 3,852,817, to provide a recording and/or reproducing apparatus which can accommodate either a magnetic tape cassette or a so-called magnetic card, that is, a card having a magnetic stripe affixed thereto as the recording medium. Although the foregoing dual-purpose apparatus can accommodate either a tape cassette or a magnetic card without the need to employ an adapter, the structure of such apparatus is undesirably complicated, for example, in providing individual arrangements for driving the tape and the card, respectively. Further, with the existing dual-purpose apparatus adapted to be changed-over to accommodate either a tape cassette or a magnetic card, the apparatus can be damaged if a tape cassette is inserted into the apparatus at a time when the latter has been changed-over for accommodating a card. Moreover, in the existing dual-purpose apparatus for use with a tape cassette or a magnetic card, the card can be damaged by a tape guiding member provided in the apparatus. Finally, no provision is made in the existing dual-purpose apparatus for preventing erroneous erasing of signals recorded on a tape in a cassette, or for de-activating the same when using a magnetic card.

OBJECTS AND SUMMARY OF THE INVENTION

Accordingly, it is an object of this invention to provide an improved recording and/or reproducing apparatus which can selectively accommodate either a tape cassette or a magnetic card, and which avoids the previously mentioned specific disadvantages of the dual-purpose apparatus heretofore provided for that purpose.

More particularly, it is an object of this invention to provide a relatively simple and reliable apparatus for selectively recording and/or reproducing signals on either a magnetic tape contained in a cassette or on a magnetic stripe or band affixed to a linearly movable card.

Still another object is to provide an apparatus, as aforesaid, capable of being changed-over to handle either a tape cassette or a magnetic card as the record medium, and in which damage to either the apparatus or the record medium is avoided in the event that an attempt is made to insert a tape cassette or a magnetic card in the apparatus when the latter is conditioned for the card mode of operation or the cassette mode of operation, respectively.

Still another object is to provide an apparatus as aforesaid, which can prevent erroneous or undesired erasing of signals prerecorded on the tape in a cassette when the apparatus is in its cassette mode of operation, and in which the change-over of the apparatus to its card mode of operation makes it possible to employ the apparatus for recording as well as reproducing signals on the magnetic band or stripe of the linearly movable card.

In accordance with an aspect of this invention, an apparatus for recording and/or reproducing signals on a magnetic recording medium in the form of a tape contained in a cassette and being movable in a run along a side of the cassette, or in the form of a card having a magnetic stripe or band affixed thereto parallel to an edge portion of the card, comprises a housing having a recess which, in a cassette mode of operation of the apparatus, is adapted to receive the tape cassette with the tape run therein being coincident with a recording medium transport path extending across the recess, and means which, in a card mode of operation of the apparatus, is adapted to guide a card with the stripe thereof in the transport path, a rotatable capstan extending into the recess adjacent the transport path, a head carriage mounted in the housing for reciprocal movements in directions normal to the transport path between operative and inoperative positions, magnetic head means on the carriage engageable with the magnetic recording medium in the transport path when the carriage is in its operative position, a pinch roller cooperating with the capstan upon movement of the head carriage to its operative position for driving the tape or card therebetween along the transport path, a tape guide member urged to project into the transport path for guiding the tape in such path adjacent the head means in response to movement of the carriage to its operative position in the cassette mode of operation of the apparatus, and mode change-over means selectively actuable for establishing the cassette mode of operation and the card mode of operation, respectively, with such mode change-over means including an element blocking the projection of the tape guide member into the transport path when the carriage is moved to its operative position in the card mode of operation.

Further, in accordance with a feature of this invention, the housing of the apparatus is provided with a pivoted cover movable between an opened position to permit the insertion and removal of a cassette and a closed position for enclosing the recess, and the cover has a slidable portion movable between an extended position at which it engages the adjacent edge of the recess to complete the closing thereof and a retracted position at which the slidable cover portion is spaced from the adjacent edge of the recess to guide the card therebetween. Preferably, the mode change-over means of the apparatus according to this invention includes latch means operative in the card mode of operation for locking the pivoted cover in its closed position.

In accordance with another feature of this invention, each cassette adapted for use in the apparatus has indicating means selectively capable of first and second indications, for example, constituted by at least one aperture normally obstructed by an element which is removable therefrom to provide the first and second indications by the presence and absence, respectively, of the element in the aperture, and the apparatus further comprises means selectively actuable for effecting recording and reproducing operations, respectively, record-prevent means to prevent recording in the cassette mode of operation in response to said second indication of the indicating means of a cassette in the recess of the housing, and means responsive to actuation of the mode change-over means for rendering the record-prevent means ineffective in the card mode of operation.

The above, and other objects, features and advantages of the invention, will be apparent from the following detailed description of an illustrative embodiment which is to be read in connection with the accompanying drawings.

BRIEF DESCRIPTION OF THE DRAWINGS

FIGS. 3 and 4 are perspective views illustrating a recording and/or reproducing apparatus according to this invention when conditioned for use with the micro-cassette of FIG. 1, or with the magnetic card of FIG. 2, respectively;

DESCRIPTION OF THE PREFERRED EMBODIMENT

Figure 1:
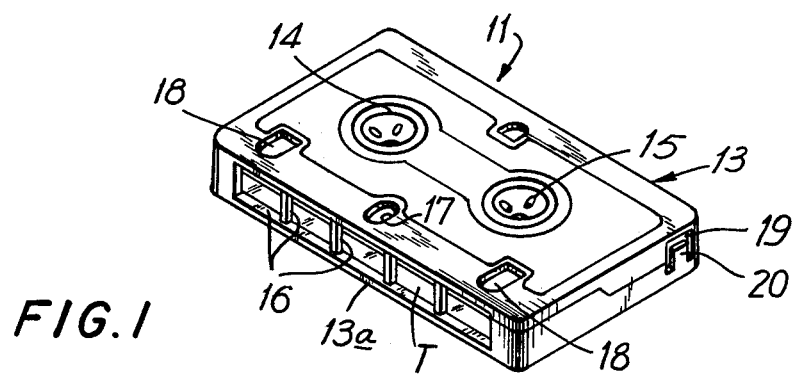
FIG. 1 is a perspective view of a so-called micro-cassette that may be used in a recording and/or reproducing apparatus according to this invention.
Figure 2:
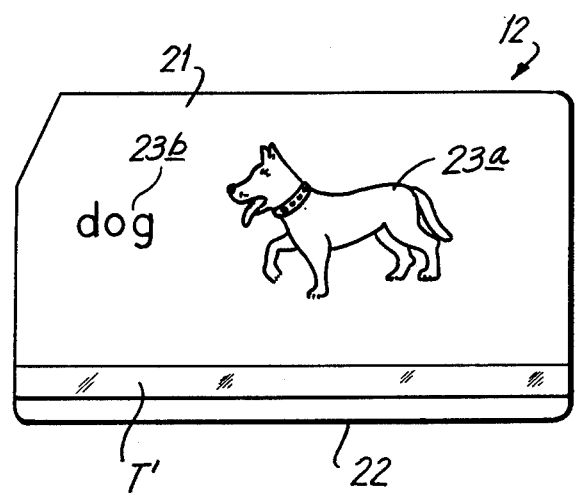
FIG. 2 is a front elevational view of a magnetic card of a type that may also be used in the recording and/or reproducing apparatus according to this invention.

Referring to the drawings in detail, it will be seen that a magnetic recording and/or reproducing apparatus 10 according to this invention, as shown on FIGS. 3 and 4, is intended to be used in connection with alternative recording media either in the form of a tape cassette 11 (FIG. 1) or a magnetic card 12 (FIG. 2).

The tape cassette 11 is particularly shown to be a so-called micro-cassette which has been dimensionally standardized by a number of manufacturers so as to be one-quarter of the size of the usual compact cassette. As shown, micro-cassette 11 includes a substantially rectangular casing 13 containing rotatable supply and take-up reels 14 and 15 on which a magnetic tape T is wound. The tape between reels 14 and 15 is suitably guided so as to be movable in a run extending along a relatively long side 13a of rectangular casing 13 which is provided with a series of windows or openings 16 for exposing the tape therealong. The top and bottom walls of cassette casing 13 are provided with aligned central apertures 17 disposed adjacent long side 13a for receiving a rotated capstan which, as hereinafter described, can engage the adjacent run of tape T for driving the latter. Further, guide openings 18 are provided in the top and bottom walls of cassette casing 13 adjacent the opposite ends of its long side 13a for receiving guiding pins or posts by which the micro-cassette 11 may be accurately positioned within a recording and/or reproducing apparatus. Finally, micro-cassette 11 is shown to include indicating means for preventing erroneous erasing of signals recorded on the tape T. As shown, such indicating means conventionally includes an aperture 19 provided in each of the relatively short sides or ends of cassette casing 13 and being normally obstructed by a frangible element or tab 20. When aperture 19 is obstructed by tab 20, the presence of tab 20 indicates that recording as well as reproducing operations may be performed on the tape T. On the other hand, when the frangible tab 20 is removed, the absence of such tab from aperture 19 indicates that the signals recorded on tape T are not to be erased, that is, a recording operation is not to be performed on the tape.

Referring now to FIG. 2, it will be seen that the conventional magnetic card which may be alternatively employed in the recording and/or reproducing apparatus 10 according to this invention includes a generally rectangular card 21 of relatively rigid cardboard, plastic sheet material or the like having a band or strips T' of magnetic material affixed to card 21 and extending parallel to an edge 22 of the card. An illustration 23a, for example, of a dog, as shown, is printed or otherwise applied on card 21 which may further carry printed indicia 23b, for example, constituting the name of the illustrated figure. The band or stripe T' of magnetic material may be pre-recorded with audio signals which, when reproduced, provide the correct pronunciation of the word represented by indicia 23b or show the use of such word in a sentence, and the apparatus according to the present invention may be employed either for reproducing the signals pre-recorded in band or stripe T', or for recording other signals in such band or stripe of magnetic material.

Referring to FIGS. 3 and 4 in detail, it will be seen that the apparatus 10 according to this invention for accommodating either the micro-cassette 11 or magnetic card 12 generally comprises a housing 24 including a rectangular body 25 which may be molded of synthetic resin or the like, and which, at least in part, defines the chassis of apparatus 10. The housing 24 further includes a pressed metal lower portion 26 covering the underside of body 25, and pressed metal upper portions 27 and 28 covering the opposite end portions of the top of body 25 and being spaced longitudinally from each other so as to define a recess 29 therebetween which is adapted to receive the micro-cassette 11, as indicated in broken lines on FIG. 3. The housing 24 is completed by a pivoted cover 30 swingably movable, for example, in the direction indicated by the arrow *a* on FIG. 3, between an opened position, as shown on FIG. 10, to permit the insertion and removal of the cassette 11 and a closed position, as shown in FIG. 3, in which cover 30 closes recess 29 for enclosing the cassette 11 therein.

Figure 10:
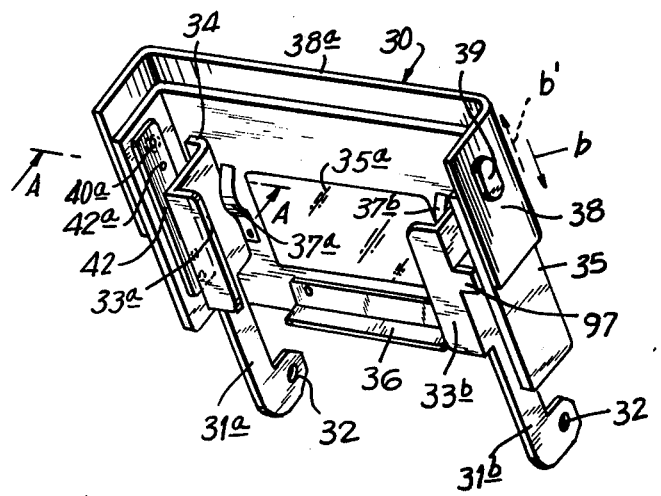
FIG. 10 is a perspective view of a pivoted cover included in the apparatus of FIGS. 3 and 4 and which forms a cassette holder.
Figure 11:
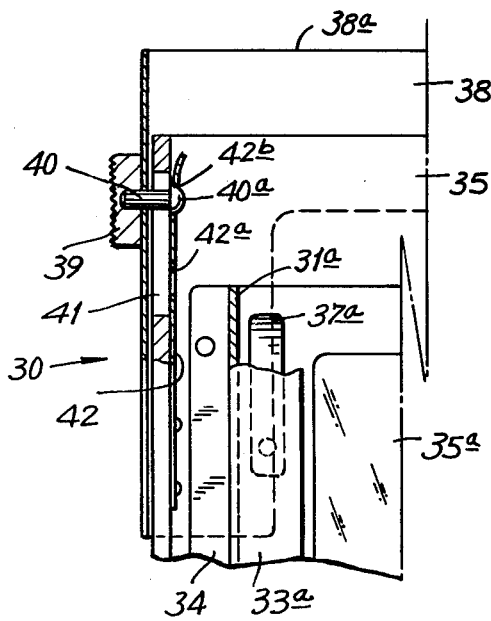
FIG. 11 is a fragmentary, enlarged sectional view taken along the line A—A on FIG. 10.

As is shown particularly on FIGS. 10 and 11, the cover 30 preferably forms a cassette holder of the kangaroo-pocket type and includes opposite elongated side frame members 31*a* and 31*b* having apertures 32 at one end to receive a pivot pin or pins (not shown) for pivotal mounting in respect to body 25 of the housing. Side frame members 31*a* and 31*b* are shown to be formed, along their lower edges, with inwardly directed flanges 33*a* and 33*b*, while the upper portions of side frame members 31*a* and 31*b* are outwardly flanged, as at 34, and suitably secured to the underside of a main cover portion 35 of inverted U-shaped cross section. The main cover portion 35 may be provided with a central transparent section or window 35*a* through which a cassette held by cover 30 can be observed. A stop 36 depends from the laterally extending edge of main cover portion 35 closest to the pivoting axis of cover 30 so that, when the latter is tilted to its open position, as shown in FIG. 10, a cassette 11 may be slideably inserted under main cover portion 35 between side frame members 31*a* and 31*b* so as to be supported on flanges 33*a* and 33*b* and against stop 36. Arcuate leaf springs 37*a* and 37*b* are shown to be attached to the underside of main cover portion 35 so as to resiliently urge a cassette against flanges 33*a* and 33*b* when the cassette is slideably inserted in cover 30.

Pivoted cover 30 is further shown to include a slideable cover portion or extension 38 which fits slideably over main cover portion 35 and is similarly of inverted U-shaped cross section. Projections 39 extend outwardly from the opposite sides of slideable cover portion 38 and are secured to the latter by pins 40 (FIG. 11) which have headed inner end portions slideable along slots 41 in the respective sides of main cover portion 35. Thus, slideable cover portion 38 is mounted on main cover portion 35 so as to be moveable relative to latter in the directions of the arrows *b* and *b'* on FIG. 10 between an extended position (FIG. 3) in which edge 38*a* of slideable cover portion 38 engages an adjacent edge 29*a* of recess 29 to complete the closing thereof, and a retracted position (FIG. 4) in which edge 38*a* of slideable cover portion 38 is spaced from the adjacent edge 29*a* of recess 29 to define a gap or slot therebetween in which the magnetic card 12 may be guided. A detent structure is preferably provided for releaseably holding slideable cover portion 38 in either its extended or retracted position. As shown, such detent structure may be constituted by a leaf spring 42 secured at one end against the inner surface of each side of main cover portion 35 and having suitably spaced apart openings 42*a* and 42*b* each with a diameter slightly smaller than that of the head 40*a* of the adjacent pin 40. The openings 42*a* and 42*b* are located to selectively receive head 40*a* of the adjacent pin 40 in the retracted and extended positions, respectively, of slideable cover portion 38. It will be apparent that projections 39 on slideable cover portion 38 can be grasped for effecting slideable movement of cover portion 38 between its retracted and extended positions relative to main cover portion 35 and also for effecting pivotal movements of cover 30, as a whole, between its opened and closed positions.

Figure 5:
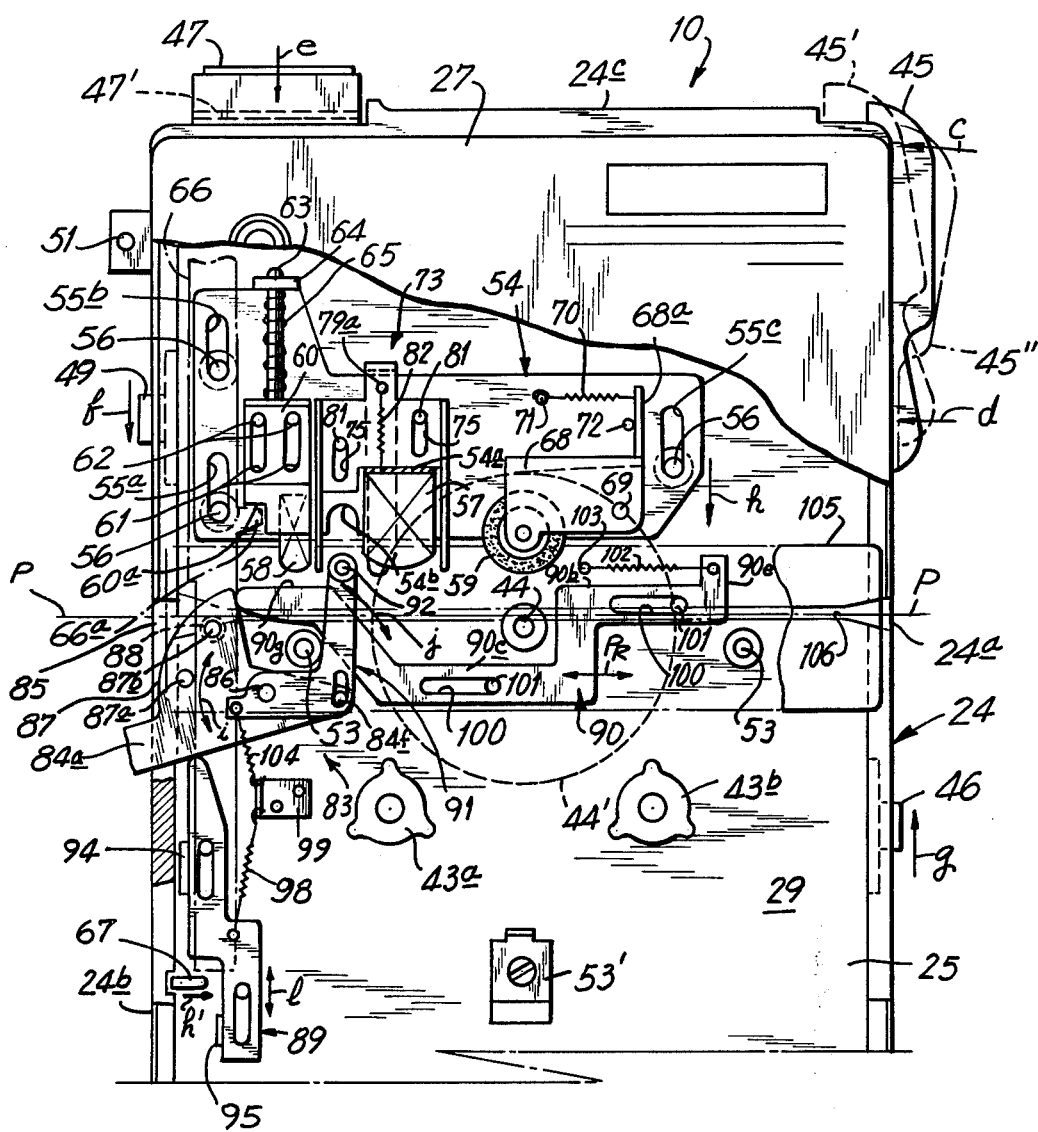
FIGS. 5 and 6 are enlarged plan views showing essential elements of the apparatus of FIGS. 3 and 4 with a portion of the housing cut away, and with the apparatus being conditioned for use with the micro-cassette of FIG. 1 and the magnetic card of FIG. 2, respectively.
Figure 6:
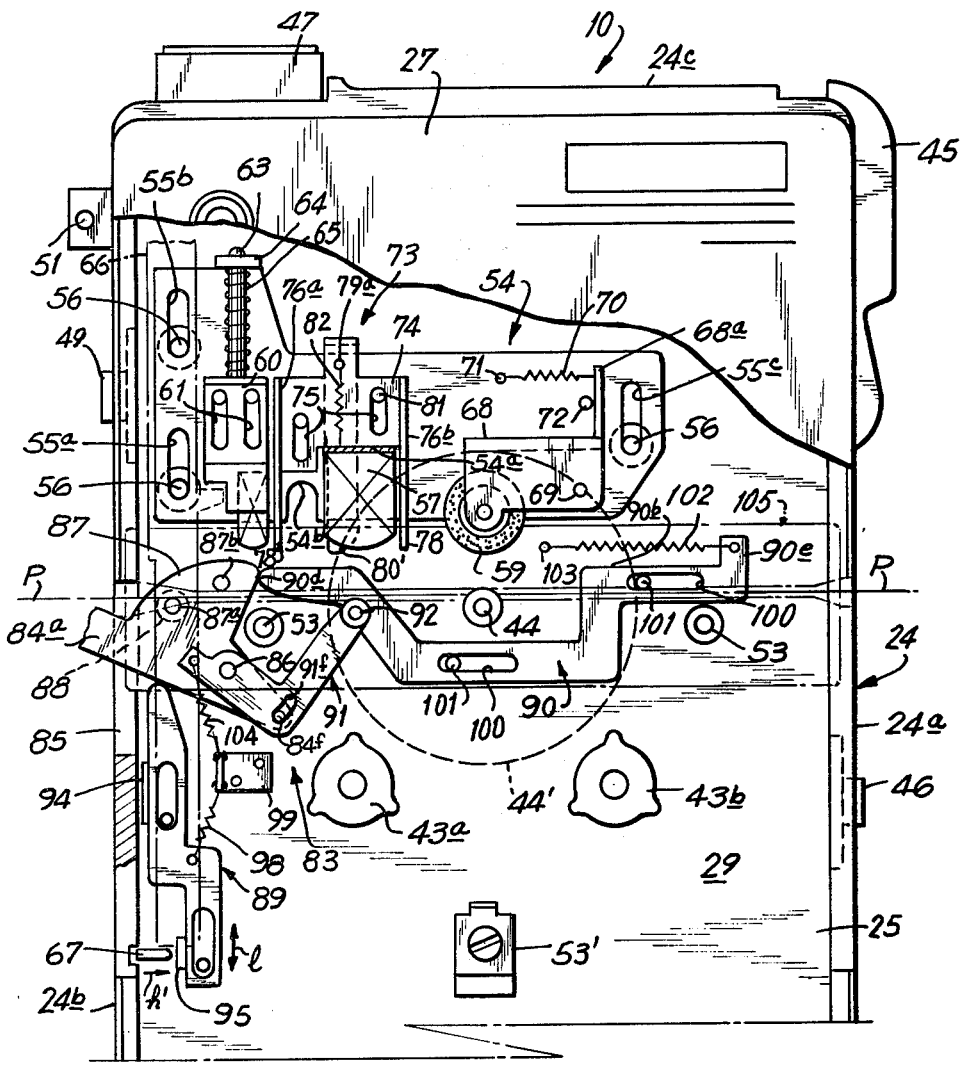

As shown on FIGS. 5 and 6, in the illustrated apparatus 10 according to this invention, supply and take-up reel shafts 43*a* and 43*b* extend upwardly from body or chassis 25 within recess 29 so as to be rotatably coupled with supply and take-up reels 14 and 15 of cassette 11 when the latter is operatively positioned or held by cover 30 in the closed position of the latter. Further, a capstan 44 extends from body 25 into recess 29 so that, when the cassette 11 is operatively positioned in recess 29, capstan 44 will project into openings 17 of cassette casing 13 in back of the run of the tape T exposed at the openings 16.

As is usual in apparatus of the type intended to be used with a micro-cassette, the apparatus 10, when used with micro-cassette 11, has a reproducing mode of operation in which the tape T in cassette 11 is driven at a predetermined speed in the direction toward the take-up reel 15 on which the tape is wound while signals previously recorded on the tape are being reproduced, a recording mode of operation in which the tape is again driven at the predetermined speed, as aforesaid, while any signals previously recorded on the tape are erased and new signals are recorded on the tape following such erasure, a fast forward mode of operation in which the take-up reel is rotated at a relatively high speed so as to effect the rapid transfer of the tape from the supply reel to the take-up reel, a rewind mode of operation in which the supply reel 14 is rotated at a relatively high speed so as to effect the rapid return of the tape from the take-up reel back to the supply reel, and a stop mode in which a cassette may be inserted in, or removed from the recess 29 in housing 24. In order to selectively establish the foregoing modes of operation of apparatus 10, the latter is shown on FIG. 5 to include a rockable forward-rewind button 45 extending from a side 24*a* of housing 24 at the corner of the latter defined by that side 24*a* and an end 24*c* of the housing, a fast-forward button 46 projecting from side 24*a*, and a record button 47 projecting from housing end 24*c* adjacent the corner defined by the latter and the side 24*b* remote from side 24*a*. Further, as shown on FIGS. 3 and 4, an earphone jack 48*a* and a microphone jack 48*b* may be provided at end 24*c* of the housing, while side 24*b* of the housing has extending therefrom a button 49 actuable for obtaining a review mode of operation 10, a jack 50 for connection to an external power supply source, a ring 51 for connection to a carrying strap, and a release button 52 that is actuable to permit the removal of a battery case from housing 24.

Selective actuations of buttons 45, 46 and 47 are effective to control a change-over mechanism (not shown) which may be of the type disclosed in detail in U.S. patent application Ser. No. 629,676, filed Nov. 6, 1975, and having a common assignee herewith, so as to establish the various modes of operation of apparatus 10 when used in connection with a micro-cassette 11. Such change-over mechanism does not form a part of the present invention, and, therefore, has not been shown or described in detail herein. However, it may be noted that the reproducing mode of operation of apparatus 10 is achieved by rocking or pushing button 45 in the direction of the arrow *c* on FIG. 5, so as to displace such button to the position indicated in broken lines at 45' on FIG. 5. If button 45 is rocked or pushed in the direction of the arrow *d* on FIG. 5 at a time when apparatus 10 is in its reproducing mode, button 45 is returned to its neutral or rest position shown in full lines, and, accordingly, change-over from the reproducing mode back to the stop mode is achieved. If button 45 is pushed further in the direction of the arrow $d$ on FIG. 5, for example, to the position indicated in dash-dot lines at 45", the rewind mode of operation of apparatus 10 is achieved. If button 47 is pushed in the direction of the arrow $e$ on FIG. 5 at a time when the apparatus is in its reproducing mode, that is, when button 45 is already located at 45', then apparatus 10 is changed-over from its reproducing mode to its recording mode. If button 47 is pushed in the direction of the arrow $e$ at a time when the apparatus is in its stop mode, that is, when button 45 is in the position shown in full lines of FIG. 5, the effect of the change-over mechanism is to change-over the apparatus from its stop mode to its recording mode of operation with button 45 being moved to the position 45'. At any time during a recording operation, the apparatus can be restored to its stop mode merely by pushing button 45 in the direction of the arrow $d$ so as to restore button 45 to the neutral or stop position shown in full lines on FIG. 5. Thus, each of the recording, reproducing and rewind modes of operation of apparatus 10, after having been established, continues in force until such time as button 45 is restored to its neutral or rest position. On the other hand, a review mode of operation established by displacement of button 49 in the direction of the arrow $f$ on FIG. 5, or a fast-forward mode of operation established by displacement of button 46 in the direction of the arrow $g$ preferably continues in effect only so long as the respective button is displaced against a resilient or spring force urging such button to return to its neutral or inactive position.

As further shown in broken lines on FIGS. 5 and 6, the capstan 44 may be provided with a fly wheel 44' located under the chassis body 25 and being suitably driven at a constant speed by a drive source, such as, an electric motor or the like. Locating pins or posts 53 are shown to project from chassis body 25 at opposite sides of the capstan 44 so as to be receivable in openings 18 of the cassette 11 for precisely locating the latter within recess 29. A spring 53' mounted at the bottom of recess 29 may be engageable with the side of cassette housing 13 remote from side 13a for taking-up any play in the engagement of post 53 in openings 18. When a cassette 11 is thus accurately located, the run of the tape T extending along side 13a of the cassette casing is coincident with a recording medium transport path extending across recess 29 and being indicated by the broken line P—P on each of FIGS. 5-8.

Figure 7:
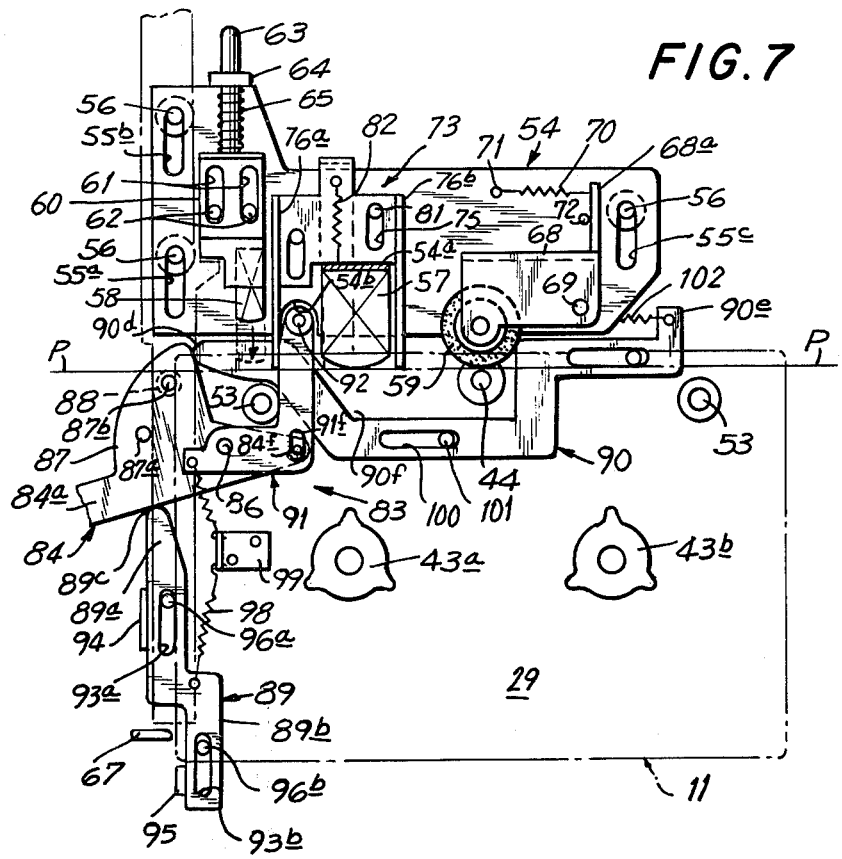
FIGS. 7 and 8 are views generally corresponding to FIGS. 5 and 6, respectively, but showing the apparatus according to the invention being used for driving the tape in a cassette and for driving a linearly movable card, respectively.
Figure 8:
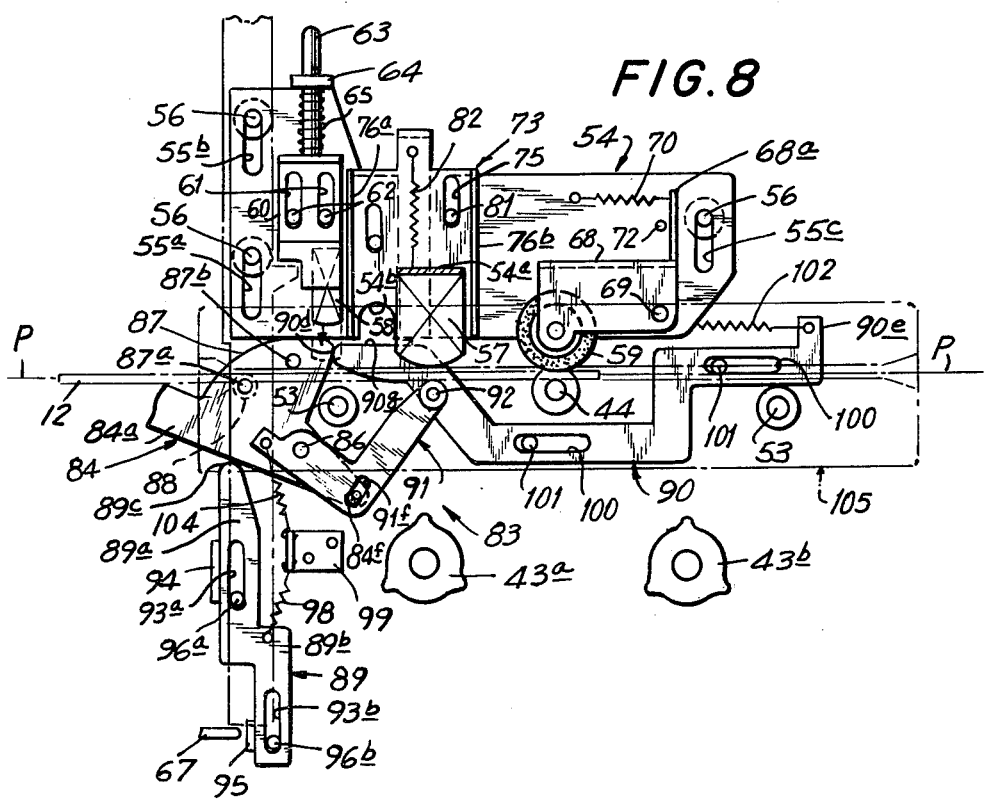

The apparatus 10 is further shown to have a head carriage or base plate 54 mounted within housing portion 27 for reciprocal movements in directions normal to the transport path P—P, for example, between an inoperative position shown on FIGS. 5 and 6 and an operative position shown on FIGS. 7 and 8. In order to provide for such movement of head carriage 54, the latter is shown to be formed with slots 55a and 55b arranged in series in one side portion of carriage 54 and a single elongated slot 55c in the opposite side portion of the carriage, and guide pins 56 are anchored in chassis body 25 and slidably received in slots 55a–55c for guiding carriage 54. The movement of head carriage 54 in the direction of the arrow $h$ on FIG. 5 from the inoperative position to the operative position (FIGS. 7 and 8) is effected in response to displacement of button 45 to the position indicated at 45' and/or in response to displacement of button 47 in the direction of the arrow $e$, for selecting either the reproducing or recording mode of operation.

A magnetic recording and/or reproducing head 57 is fixed on a central portion of carriage 54 and projects from the latter so as to be engageable with a magnetic recording medium in the transport path P—P when carriage 54 is in its operative position (FIGS. 7 and 8). A magnetic erasing head 58 and a pinch roller 59 are also arranged on carriage 54 at the left- and right-hand sides of recording and/or reproducing head 57. The magnetic erasing head 58 is mounted on a head-holder 60 preferably formed of synthetic resin and having slots 61 receiving guide pins 62 extending from carriage 54 for slidably mounting head-holder 60 on carriage 54. Head-holder 60 is further guided in its movements relative to carriage 54 by a rod 63 projecting longitudinally from head-holder 60 and extending slidably through an apertured lug 64 on carriage 54. A helical spring 65 extends around rod 63 between head-holder 60 and lug 64 for yieldably urging head-holder 60 to its active position (FIGS. 5 and 6) in which erasing head 58 projects from carriage 54 to the same extent as recording and/or reproducing head 57 and guide pins 62 engage ends of slots 61 for limiting the movement of head-holder 60 by spring 65.

It will be apparent that, if head-holder 60 remains in its active position relative to carriage 54 upon movement of the latter to its operative position, then erasing head 58 will be engageable with a magnetic recording medium in transport path P—P in advance of the location of engagement of head 57 with the recording medium. In that case, erasing head 58 will erase any signals previously recorded on the recording medium, and head 57 is thereafter operative to record new signals on the recording medium. According, in the illustrated apparatus, as is known, head-holder 60 remains in its active position relative to carriage 54 upon movement of the latter to its operative position, only when such movement of carriage 54 occurs in connection with the selection of the recording mode of operation of the apparatus. On the other hand, when carriage 54 is moved to its operative position in response to selection of the reproducing mode of operation of apparatus 10, movement of head-holder 60 with carriage 54 is blocked so that head-holder 60 and erasing head 58 thereon then occupy an inactive position relative to carriage 54, as shown in full lines on FIG. 7, with the result that erasing head 58 is substantially removed or spaced from transport path P—P and will not disturb the signals recorded on the recording medium being moved along such path.

In the illustrated apparatus 10, a conventional control arrangement for erasing head 58 is shown in dot-dash lines on FIGS. 5-8 to be in the form of an elongated slide member 66 extending along side 24b of housing 24 and being longitudinally movable in respect to the housing. Slide member 66 is either integral, or otherwise associated with record button 47 so as to be movable with the latter. Slide member 66 has a lateral projection 66a extending therefrom so as to be engageable by a shoulder 60a formed on head-holder 60. It will be apparent that, when record button 47 is pushed or depressed in the direction of the arrow $e$, for example, to the position indicated in broken lines at 47' on FIG. 5, slide member 66 is similarly displaced for moving projection 66a away from shoulder 60a and thereby permitting head-holder 60 to remain in its active position relative to carriage 54 during movement of the latter to its operative position in response to such actuation of record button 47.

On the other hand, if carriage 54 is moved to its operative position in response to actuation of only button 45 to the position indicated at 45' for selecting the reproducing mode of operation, then slide member 66 remains in the position shown on FIGS. 7 and 8 and its projection 66a blocks movement of head-holder 60 with carriage 54 so as to dispose holder 60 in its inactive position, as shown in full lines on FIGS. 7 and 8.

As previously noted, the micro-cassette 11 intended for use in apparatus 10 includes indicating means in the form of an aperture 19 in each of its relatively short sides or ends which is normally obstructed by a frangible tab 20, and the apparatus 10 further includes a conventional arrangement for preventing the selection of the recording mode of operation when such tab is absent from the aperture 19 for indicating that signals previously recorded on the tape are not to be erased therefrom. More particularly, as shown schematically on FIGS. 5–8, the apparatus 10 has a conventional detecting element 67 provided with a detecting finger portion adapted to engage a cassette 11 operatively positioned in recess 29 at the location of one of its apertures 19, and being suitably urged in the direction of the arrow h' on FIG. 5 so as to enter such aperture 19 when the frangible tab 20 is absent therefrom. When the detecting finger portion of element 67 thus enters an aperture 19 of an operatively positioned cassette 11, a blocking portion of detecting element 67 is moved into the path of slide member 66 so as to prevent downward movement thereof, as viewed on FIGS. 5–8. Thus, when a cassette 11 is operatively positioned in recess 29 with a tab 20 absent from its aperture 19, movement of slide member 66 as would accompanying actuation of record button 47 is blocked so that the recording mode of operation cannot be selected. On the other hand, when the operatively positioned cassette 11 in recess 29 has its aperture 19 blocked by a tab 20, detecting element 67 is held by such tab against movement in the direction of the arrow h' on FIG. 5, and thus is held in an inoperative position to avoid interference with the longitudinal movement of slide member 66 accompanying the actuation or movement of button 47 for selecting the recording mode of operation.

The pinch roller 59 is shown to be rotatably mounted on a support arm 68 which is rockable relative to carriage 54 about a pivot pin 69. A tension spring 70 is connected between an extension 68a of support arm 68 and an anchor pin 71 on carriage 54 so as to yieldably urge support arm 68 in the counter-clockwise direction about pivot pin 69 to the position shown on FIGS. 5 and 6 and in which arm extension 68a engages a stop 72. Stop 72 is located on carriage 54 so that, when carriage 54 is moved to its operative position in response to selection of a recording or reproducing mode of operation, pinch roller 59 is urged against capstan 44 with a magnetic recording medium therebetween, as hereinafter described, and support arm 68 is rocked slightly to move its extension 68a away from stop 72 against the force of spring 70.

Figure 12:
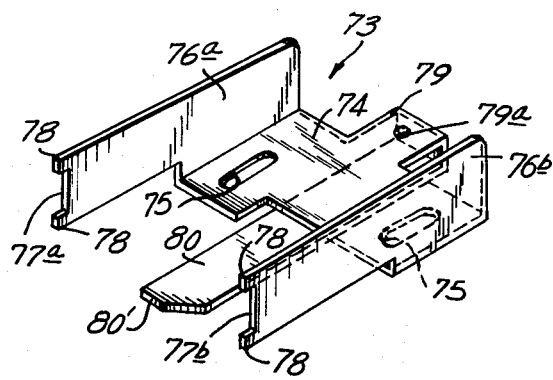
FIG. 12 is a detail perspective view of a tape guide member included in the apparatus according to this invention.

In accordance with the present invention, carriage 54 further carries a tape guide member 73 which, during the use of apparatus 10 with a micro-cassette 11, is effective to accurately guide the tape thereof in respect to the recording and/or reproducing head 57 and, during a recording operation, also in respect to the erasing head 58. As shown particularly on FIG. 12, tape guide member 73 may be formed of sheet metal to include a base portion 74 having parallel slots 75 therein, and side portions 76a and 76b directed upwardly along the opposite side edges of base portin 74 and extending longitudinally from the latter to define guiding end portions having recesses 77a and 77b, respectively, therein. Each of the recesses 77a and 77b is defined between top and bottom guide fingers 78 and has a length therebetween approximately equal to the width of the tape T in cassette 11 so that the tape may be received in recesses 77a and 77b for positioning by the tape guide fingers 78 at the top and bottom thereof. Base portion 74 of tape guide member 73 further has an extension 79 projecting centrally therefrom and then bent downwardly and reverted, as at 80, so that the reverted extensin 80, at its free end, defines an abutment 80' at a level below that of the tape guiding recesses 77a and 77b and approximately midway between the latter.

As shown on FIGS. 5–8, tape guide member 73 is mounted on carriage 54 for limited movement relative to the latter in directions normal to the transport path P—P, for example, by means of guide pins 81 extending upwardly from carriage 54 and being slidably received in slots 75. When tape guide member 73 is thus mounted on carriage 54, the reverted extension 80 of base portion 74 extends under carriage 54 and side portions 76a and 76b are disposed adjacent erasing head 58 and recording and/or reproducing head 57, respectively. A spring 82 is connected between a hole 79a in extension 79 of tape guide member 73 and a flange 54a on carriage 54 for urging tape guide member 73 downwardly, as viewed on FIGS. 5–8, to its operative or tape guiding position relative to carriage 54, as shown on FIGS. 5–7. In such operative position of tape guide member 73, tape guide fingers 78 that define the upper and lower limits of recesses 77a and 77b project slightly beyond the operative faces of the heads 57 and 58. It will be apparent that, if the movement of tape guide member 73 with carriage 54 during movement of the latter to its operative position is blocked by engagement with abutment 80' of guide member 73, as hereinafter described in detail, then tape guide member 73 is displaced upwardly relative to carriage 54 to attain the inoperative position illustrated on FIG. 8, and in which tape guide fingers 78 are retracted relative to the faces of the operatively positioned head 57 or heads 57 and 58.

The apparatus 10 according to this invention is further shown to comprise a mode change-over mechanism generally identified by the reference numeral 83 and which is selectively actuable for establishing the cassette mode of operation (FIGS. 5 and 7) or the card mode of operation (FIGS. 6 and 8) of apparatus 10.

Figure 13:
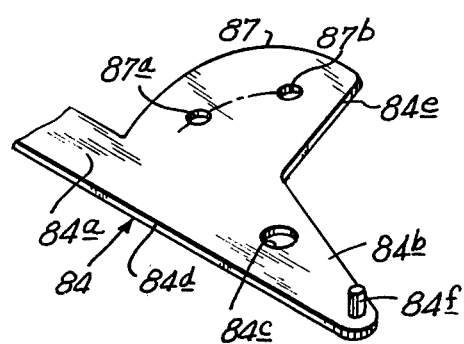
FIGS. 13–16 are enlarged perspective views showing respective elements of a change-over mechanism included in the apparatus according to this invention.

Such mode change-over mechanism 83 is shown to include a change-over lever 84 having an arm or end portion 84a projecting through a slot 85 in side 24b of housing 24 (FIGS. 3–6) so as to form a manually actuable knob or the like. Intermediate arm or end portion 84a of lever 84 and an opposite end portion 84b of the latter, lever 84 is formed with a hole 84c (FIG. 13) to receive a pivot pin 86 extending from body or chassis 25 and thereby mounting change-over lever 84 for swinging about such pivot pin, as indicated by the arrow i on FIG. 5. The change-over lever 84 is further shown to have a sector-shaped extension 87 directed laterally from one side of arm 84a so that the opposite side surface of arm 84a and a generally radially extending edge of extension 87 define abutment surfaces 84d and 84e, respectively, substantially at right angles to each other (FIG. 13). The sector-shaped extension 87 of lever 84 is further shown to have two holes 87a and 87b therein which are spaced from each other along an arcuate path that is concentric with hole 84c. A detent ball 88 is suitably mounted on chassis 25 and resiliently urged against sector-shaped extension 87 from below so as to be selectively engageable in holes 87a and 87b and thereby releasably retain change-over lever 84 in its card mode selecting position (FIG. 8) or in its cassette mode selecting position (FIG. 7), respectively.

The mode change-over mechanism 83 is further shown to include slide members 89 and 90 engageable with change-over lever 84 and being moved, in response to pivoting of lever 84, in directions normal to transport path P—P and in directions parallel to such path, respectively, and a support arm 91 which is pivotally mounted for movement with the change-over lever 84 and which carries a back-up roller 92.

The mode change-over mechanism 83 is further shown to include slide members 89 and 90 engageable with change-over lever 84 and being moved, in response to pivoting of lever 84, in directions normal to transport path P—P and in directions parallel to such path, respectively, and a support arm 91 which is pivotally mounted for movement with the change-over lever 84 and which carries a back-up roller 92.

Figure 16:
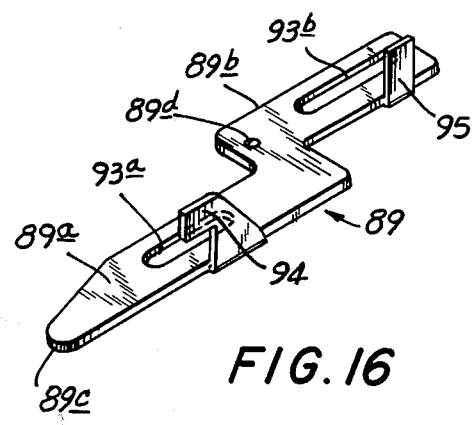

As shown particularly on FIG. 16, slide member 89 may include generally parallel, opposed end portions 89a and 89b which are laterally offset in respect to each other and have longitudinally extending slots 93a and 93b. A generally hook-shaped latching element 94 and a lug 95 extend upwardly from, and are integral with the outer edges of end portions 89a and 89b, respectively, of slide member 89.

As shown particularly on FIGS. 5–8, guide pins 96a and 96b are directed upwardly from body or chassis 25 at the bottom of recess 29 adjacent side 24b of the housing and are slidably received in slots 93a and 93b, respectively, of slide member 89 so as to mount the latter for movement in the directions normal to the transport path P—P, for example, as indicated by the arrow l on FIG. 5. When slide member 89 is thus mounted, a curved end surface 89c of its end portion 89a is engageable with abutment surface 84d of change-over lever 84. Returning to FIG. 10, it will be seen that side frame member 31b of cover 30 is formed with an outwardly directed locking lug or keeper 97 extending from its lower edge. When cover 30 is in its closed position, keeper 97 thereof is engageable by hook-shaped latching element 94 of slide member 89 for locking the cover of its closed position. A spring 98 is connected between an anchor bracket 99 (FIGS. 5–8) on body or chassis 25 and an anchor hole 89d (FIG. 16) in slide member 89 for urging the latter longitudinally in the upward direction, as viewed on FIGS. 5–8, that is, in the direction to engage its end surface 89c with abutment surface 84d of change-over lever 84.

Thus, when change-over lever 84 is positioned to select the cassette mode of operation of apparatus 10 (FIGS. 5 and 7) slide member 89 is displaced downwardly, as viewed on the drawings, against the force of spring 98 to prevent engagement of hook-shaped latching element 94 with keeper 97 on cover 30, with the result that cover 30 is free to be opened and closed. Further, when change-over lever 84 is positioned to select the cassette mode of operation, the corresponding positioning of slide member 89 moves its lug 95 out of the space within recess 29 that would be occupied by a cassette 11 when the latter is operatively positioned on locating pins 53, as particularly shown on FIG. 7.

On the other hand, when change-over lever 84 is manually displaced to the position for selecting the card mode of operation of apparatus 10 (FIGS. 6 and 8), spring 98 is effective to move slide member 89 upwardly, as viewed on the drawings, so as to engage latching element 94 with keeper 97 and thereby lock cover 30 in its closed position. Further, the position assumed by slide member 89 upon movement of change-over lever 84 for selecting the card mode of operation disposes lug 95 of slide member 89 in confronting relation to the detecting finger portion of detecting element 67. Thus, in the card mode of operation, lug 95 on slide member 89 in effect takes the place of a tab 20 obstructing the respective aperture 19 of a micro-cassette 11, with the result that detecting element 67 has its blocking portion moves out of the path of slide member 66. Accordingly, either a recording or a reproducing operation of apparatus 10 can be performed in the card mode of operation thereof.

Figure 15:
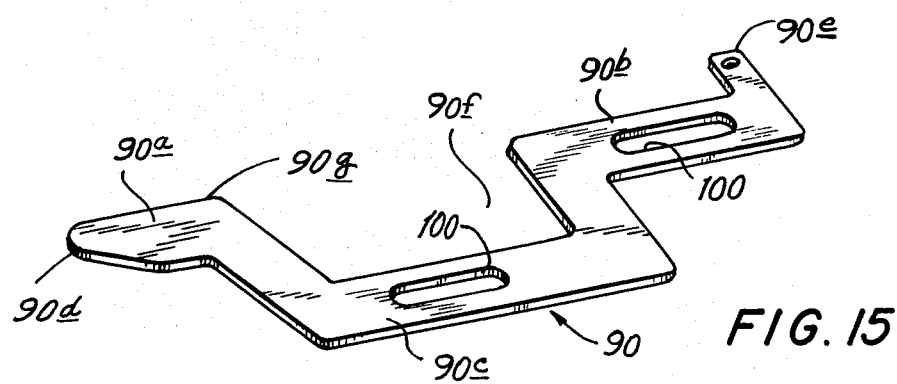

As shown particularly on FIG. 15, slide member 90 includes end portions 90a and 90b which are substantially in longitudinal alignment with each other, and a laterally offset intermediate portion 90c extending between end portions 90a and 90b. End portion 90b and intermediate portion 90c of slide member 90 have longitudinally extending slots 100 therein, and guide pins 101 extend from body or chassis 25 at the bottom of recess 29 and are slideably received in slots 100 so as to mount slide member 90 for rectilinear movements in the direction of the arrow k on FIG. 5, that is, parallel to the transport path P—P. When thus mounted, slide member 90 is disposed at the bottom of recess 29 and has the curved end surface 90d of its end portion 90a engageable with abutment surface 84e on change-over lever 84. A spring 102 (FIGS. 5 and 6) is connected between a lateral extension 90e at the free end of portion 90b of slide member 90 and an anchor pin 103 extending from chassis or body 25 for yieldably urging slide member 90 toward the left as viewed on FIGS. 5–8, that is, in the direction for maintaining engagement of end surface 90d with abutment surface 84e. It will be understood that the plane of slide member 90, when mounted at the bottom of recess 29, corresponds to the plane of reverted extension 80 of tape guide member 73.

When change-over lever 84 is positioned for selecting the cassette mode of operation (FIGS. 5 and 7), the resulting position of slide member 90 causes end portion 90a thereof to be displaced longitudinally away from the path of movement of extension 80 in the direction normal to the transport path P—P. Thus, when carriage 54 is moved to its operative position for achieving a recording or reproducing operation of the apparatus 10 in the cassette mode of operation of the latter, a laterally opening recess 90f (FIG. 15) defined at the intermediate portion of the slide member 90 is disposed to receive extension 80 of tape guide member 73 so that slide member 90 does not interfere with the movement of tape guide member 73 with the carriage 54 by means of the spring 82 (FIG. 7).

On the other hand, when change-over lever 84 is positioned for selecting the card mode of operation of apparatus 10 (FIGS. 6 and 8), abutment surface 84a of lever 84 acts against end surface 90d of slide member 90 for moving the latter toward the right as viewed on the drawings, against the force of spring 102, whereby to interpose the side edge surface 90g of end portion 90a in the path of movement of extension 80. Thus, when carriage 54 is moved to its operative position for effecting a recording or reproducing operation in the card mode of operation of the apparatus (FIG. 8), abutment 80' at the free end of extension 80 is engageable against side edge surface 90g which thereby blocks the movement of tape guide member 73 with carriage 54. Accordingly, when carriage 54 attains its operative position for disposing the face of recording and/or reproducing head 57 at transport path P—P, guide fingers 78 at the end of side portions 76a and 76b of tape guide member 73 are retracted in respect to the face of head 57, and hence are away from the transport path P—P.

Figure 14:
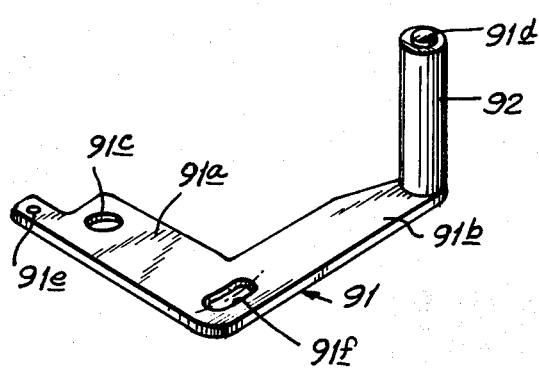

Referring now to FIG. 14, it will be seen that support arm 91 preferably has arm portions 91a and 91b extending substantially at right angles to each other. Arm portion 91a, adjacent its free end, is formed with a hole 91b for receiving pivot pin 86 and thereby mounting support arm 91 for pivotal movement with change-over lever 84. The free end of arm portion 91b has an axle 91d directed upwardly therefrom, and back-up roller 92 which is formed of a non-magnetic metal is rotatably mounted on axle 91d. Arm portion 91a of support arm 91 has an extension 91e, and a spring 104 is connected between such extension 91e and anchor bracket 99 for yieldably urging support arm 91 in the counter-clockwise direction about pivot pin 86, as viewed on FIGS. 5–8. Further, a lost-motion connection or coupling is provided between change-over lever 84 and support arm 91 so that the latter will generally follow the pivotal movements of lever 84 and similarly swing about pivot pin 86 as indicated by the arrow j on FIG. 5. As shown, such lost-motion coupling or connection between lever 84 and support arm 91 may be constituted by a coupling pin 84f (FIG. 13) projecting upwardly from end portion 84b of lever 84 and being slideably received in an arcuate slot 91f (FIG. 14) formed in support arm 91 and having its center of curvature coincident with pivot pin 86.

When change-over lever 84 is disposed for selecting the cassette mode of operation of apparatus 10 (FIGS. 5 and 7), spring 104 is effective to urge support arm 91 to the illustrated position in which the lower end of its arcuate slot 91f engages against coupling pin 84f on lever 84 and back-up roller 92 is spaced from transport path P—P at the side of the latter facing away from recess 29 at a location between heads 57 and 58. Further, at such location between heads 57 and 58, carriage 54 is shown to be formed with a cutout 54b in the edge of the carriage facing towards recess 29. Thus, when carriage 54 is moved to its operative position (FIG. 7) for a recording or reproducing operation of the apparatus in its cassette mode of operation, back-up roller 92 is accommodated in recess or cutout 54b of carriage 54 so as to avoid any interference with the movement of carriage 54 to its operative position while such back-up roller 92 is disposed out of recess 29 to avoid interference with the insertion or removal of a cassette 11 in the latter.

On the other hand, when change-over lever 84 is moved to the position thereof for selecting the card mode of operation of apparatus 10, the engagement of coupling pin 84f in arcuate slot 91f causes pivoting of support arm 91 to the position shown on FIG. 6, and in which back-up roller 92 is substantially tangential to transport path P—P at the side of the latter opposite to recording and/or reproducing head 57. Upon movement of the carriage 54 to its operative position for effecting a recording or reproducing operation in the card mode of operation of apparatus 10 (FIG. 8), head 57 and back-up roller 92 are engageable with the opposite surfaces of a magnetic card 12 being fed therebetween and, by reason of the thickness of such card, support arm 91 may be displaced slightly in the clockwise direction against the force of spring 104 to space coupling pin 84f from the lower end of arcuate slot 91f and thereby cause roller 92 to exert a yieldable pressure on the card 12 against the operative face of head 57.

Figure 9:
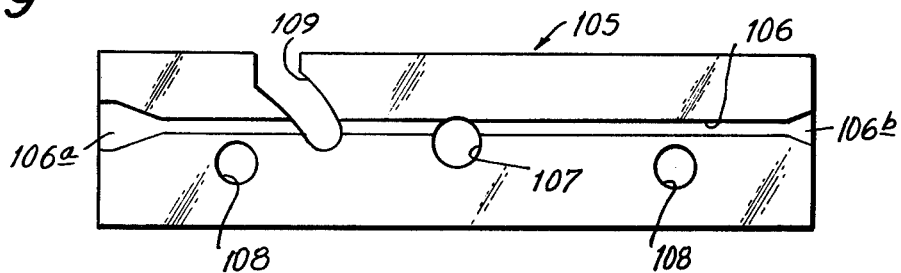
FIG. 9 is a detail plan view of a card guide member included in the apparatus according to this invention.

The apparatus 10 is further preferably provided with a guide plate 105 which, as shown partly in dot-dash lines on FIG. 5, extends laterally across recess 29 in the region of transport path P—P. Plate 105 is shown to be formed with a longitudinal, upwardly-opening groove 106 which corresponds with the transport path and which is adapted to slideably receive and guide the lower edge 22 of magnetic card 12 during the recording or reproducing of signals on the magnetic stripe T' thereof (FIG. 2). The guide plate 105 may be formed of a transparent or other synthetic resin and preferably has its groove 106 formed with flaring ends 106a and 106b (FIG. 9) for facilitating the entry and exit of card 12 into and out of groove 106. The opposite ends of guide plate 105 may be suitably supported on opposite side portions of body or chassis 25 so that guide plate 105 extends above the planes of change-over lever 84, slide member 90 and support arm 91. Of course, the level at which guide member 105 is supported is selected so that such guide member 105 will not interfere with the operative positioning of a cassette 11 in recess 29. As shown particularly on FIG. 9, guide plate 105 has a central hole 107 substantially tangential to groove 106 for permitting capstan 44 to project upwardly through such hole 107 and achieve driving engagement with the lower edge portion of a card 12 guided along groove 106. Guide member 105 is further shown to have spaced apart apertures 108 through which posts 53 may project upwardly into openings 18 of a cassette 11 above guide plate 105 for precisely locating the cassette in recess 29. Finally, guide plate 105 is shown to have an arcuate cutout 109 through which back-up roller 92 can project upwardly from support arm 91. It will be apparent that arcuate cutout 109 is shaped to permit the movement therealong of back-up roller 92 between the positions shown on FIGS. 5 and 6, respectively.

The above-described apparatus 10 according to this invention operates as follows:

Cassette Mode of Operation

In order to adapt apparatus 10 for operation with the micro-cassette 11, arm or knob 84a of change-over lever 84 is manually displaced to the position shown on FIGS. 3, 5 and 7, with the result that the other elements of change-over mechanism 83, that is, slide members 89 and 90 and support arm 91, assume the positions illustrated on FIGS. 5 and 7. With the change-over mechanism 83 thus positioned, cover 30 may be pivoted to its opened position to receive a micro-cassette 11, and then returned to its closed position for operatively positioning the micro-cassette in recess 29, as indicated by the dot-dash line on FIG. 7. It will be apparent that, when the micro-cassette 11 is operatively positioned in recess 29, the run of tape T extending along side 13a of cassette housing 13 coincides with the transport path P—P so that such run of the tape extends between capstan 44 projecting through openings 17 of the cassette housing and pinch roller 59 which is engageable with the tape through one of windows 16 of the cassette housing.

With micro-cassette 11 operatively positioned in recess 29, apparatus 10 may be operated in a manner similar to that of a conventional micro-cassette-type tape recorder. Thus, button 45 may be manually pushed in the direction of the arrow c on FIG. 5 to position 45' for effecting a reproducing operation. In response to such actuation or displacement of button 45, carriage 54 is moved to its operative position shown on FIG. 7 so that the run of the tape T in cassette 11 which is coincident with transport path P—P is pressed by pinch roller 59 against capstan 44, and thus is driven by the capstan at a predetermined constant speed, while the take-up and supply reels of the cassette are suitably driven by the take-up and supply reel drive shafts 43a and 43b of apparatus 10. When a reproducing operation is established, slide member 66 remains in the position shown on FIGS. 5 and 7 so that its lateral projection 66a engages shoulder 60a of head-holder 60 and thereby maintains the latter in its inactive position relative to carriage 54. In such inactive position of head-holder 60, erasing head 58 is substantially removed or spaced from the tape in cassette 11, as shown in full lines on FIG. 7, whereby to prevent erasing of the signals from the tape furing the reproducing operation.

With apparatus 10 in its cassette mode of operation, slide member 89 is displaced against the force of spring 98 to the position shown on FIGS. 5 and 7, and in which latching element 94 is held out of engagement with keeper 97 of cover 30 so as to permit such cover to be opened and closed, and further in which lug 95 on slide member 89 is remote from detecting element 67 so that the latter can respond to the presence or absence of a tab 20 in the adjacent aperture 19 of the cassette housing. If a tab 20 is present in such aperture 19, detecting element 67 responds thereto to permit longitudinal displacement of slide member 66 in response to actuation of button 47 to the position indicated in broken lines at 47' on FIG. 5 for establishing the recording operation of apparatus 10. More particularly, the longitudinal displacement of slide member 66 permits spring 65 to cause movement of head-holder 60 with carriage 54 upon movement of the latter to its operative position so that, as shown in broken lines on FIG. 7, the erasing head 58 is then disposed to engage the tape in path P—P for erasing signals therefrom prior to the engagement of the tape by head 57 for recording signals on the tape. On the other hand, if the tab 20 has been removed from the aperture 19 of the operatively positioned cassette 11, detecting element 67 responds thereto for blocking the longitudinal movement of slide member 66 and thereby preventing the establishment of the recording mode of operation.

It will further be apparent that, when change-over lever 84 is disposed for establishing the cassette mode of operation of apparatus 10, slide member 90 is disposed with its recess 90f positioned to receive extension 80 of tape guide member 73 so that slide member 90 does not interfere with the movement of tape guide member 73 with carriage 54 upon movement of the latter to its operative position. Thus, during either a reproducing or recording operation of apparatus 10 in the cassette mode of operation of the latter, the run of the tape along path P—P is received in recesses 77a and 77b between tape guide fingers 78 at the ends of side portions 76a and 76b of tape guide member 73, with the result that the tape is accurately guided in respect to the face of head 57 during reproducing, and in respect to the faces of heads 57 and 58 during recording.

Of course, with change-over lever 84 positined to establish the cassette mode of operation of apparatus 10, button 45 may be pushed in the direction of the arrow d on FIG. 5 to the position indicated at 45" so as to achieve the usual rewind operation of the apparatus. Similarly, the fast-forward button 46 may be actuated to achieve the usual fast-forward operation of the apparatus.

In all of the operations of apparatus 10 in its cassette mode of operation, support arm 91 is positioned, as shown on FIGS. 5 and 7, to dispose back-up roller 92 in alignment with cutout or recess 54b of carriage 54 so that roller 92 is out of the way of the operatively positioned cassette 11 and does not interfere with movement of carriage 54 to its operative position.

Card Mode of Operation

When it is desired to use apparatus 10 for recording and reproducing signals on magnetic card 12, change-over lever 84 is manually displaced to the position shown on FIGS. 4, 6 and 8. With cover 30 in its closed position, slideable cover portion 38 is moved to its retracted position (FIG. 4) in which edge 38a of the slideable cover portion is spaced from the adjacent edge 29a of recess 29 to define a gap or slot therebetween along which magnetic card 12 may be longitudinally transported while lower edge 22 of the magnetic card is received and guided in groove 106 of guide plate 105 near the bottom of recess 29.

With change-over lever 84 displaced to the position for selecting the card mode of operation (FIGS. 6 and 8), slide member 89 is disposed to engage its latching element 94 with keeper 97 for locking cover 30 in its closed position, while lug 95 of slide member 89 is positioned in confronting relation to the detecting finger portion of detecting element 67. Thus, in the card mode of operation, lug 95 on slide member 89, in effect, takes the place of a tab obstructing the respective aperture 19 of a micro-cassette 11, with the result that detecting element 67 cannot interfere with the recording of signals on a magnetic card 12.

Further, with change-over lever 84 positioned for selecting the card mode of operation, slide member 90 is disposed thereby so as to interpose the side edge surface 90g of its end portion 90a in the path of movement of extension 80 on tape guide member 73. Thus, when carriage 54 is moved to its operative position for effecting a recording or reproducing operation on card 12 (FIG. 8), abutment 80' at the free end of extension 80 is engageable against side edge surface 90g so as to block the movement of tape guide member 73 with carriage 54. Accordingly, with carriage 54 in its operative position for engaging head 57 with the stripe T' of magnetic material on card 12, guide member 73 is retracted in respect to head 57, that is, its tape guide fingers 78 are spaced from the transport path P—P, so as to avoid any interference with the movement of card 12 along such path.

It will also be seen that, when the card mode of operation is established, support arm 91 is pivoted to the position shown on FIG. 6 with back-up roller 92 being substantially tangential to transport path P—P at the side of the latter opposite to recording and/or reproducing head 57.

When it is desired to reproduce signals recorded on stripe T' of magnetic card 12, such card is manually inserted at one end of the gap or slot between edge 38a of slideable cover portion 38 and edge 29a of recess 29, as shown on FIG. 4, with the bottom edge 22 of the card being received in groove 106 of guide plate 105. Then button 45 is actuated, for example, to the position indicated at 45' on FIG. 5, so as to move carriage 54 to its operative position. When the leading end of the manually inserted card 12 reaches the nip between capstan 44 and pinch roller 59, the card 12 is thereafter propelled or driven at a predetermined constant speed along groove 106 by the cooperative action of rotated capstan 44 with pinch roller 59. In the course of such driving of card 12 along transport path P—P, head 57 engages magnetic stripe T' on card 12, while back-up roller 92 engages the opposite surface of card 12 for pressing the latter against head 57. It will be seen on FIG. 8 that, upon engagement of back-up roller 92 with card 12 for urging or pressing the latter against the face of head 57, coupling pin 84f on change-over lever 84 is at least slightly spaced from the ends of arcuate slot 91f in support arm 91 so that spring 104 can continue to cause back-up roller 92 to exert the desired pressure on the card against head 57 even though there may be variations in the thickness of card 12.

It will be seen from the above that the change-over of the apparatus 10 according to this invention between its cassette and card modes of operation is simply achieved merely by the actuation of change-over lever 84. Moreover, the apparatus 10 is seen to be compatible for use with cassettes and magnetic cards without the need for employing any adapters in connection therewith. Obviously, various audio or other materials may be recorded on the tape T in cassette 11 or on the magnetic stripe T' of card 12.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An apparatus for recording and/or reproducing signals on a magnetic recording medium in the form of a tape contained in a tape cassette and being movable in a run along a side of the cassette, or in the form of a stripe affixed to a card parallel to an edge portion thereof, said apparatus comprising:

a housing having a recess which, in a cassette mode of operation of the apparatus, is adapted to receive the tape cassette with said run of the tape therein being coincident with a recording medium transport tape extending across said recess, and means which, in a card mode of operation of the apparatus, is adapted to guide a card with said stripe forming the recording medium thereon in said transport path;

a rotatable capstan extending into said recess adjacent said transport path for engagement with a tape or card therein;

a head carriage mounted in said housing for reciprocal movements in directions normal to said transport path between operative and inoperative positions;

magnetic head means on said carriage engageable with the magnetic recording medium in said transport path when said carriage is in said operative position;

pinch roller means cooperating with said capstan, upon movement of said head carriage to said operative position thereof, for driving the tape or card therebetween along said transport path;

a tape guide member urged to project into said transport path for guiding the tape in such path adjacent said head means in response to movement of said carriage to said operative position in said cassette mode of operation; and mode change-over means selectively actuable to first and second positions for establishing said cassette mode of operation and said card mode of operation, respectively, said mode change-over means including means blocking the projection of said tape guide member into said transport path when said carriage is moved to its operative position in said card mode of operation so as to avoid engagement of said tape guide member with a card in said transport path.

2. An apparatus for recording and/or reproducing signals on a magnetic recording medium in the form of a tape contained in a tape cassette and being movable in a run along a side of the cassette, or in the form of a stripe affixed to a card parallel to an edge portion thereof, said apparatus comprising:

a housing having a recess which, in a cassette mode of operation of the apparatus, is adapted to receive the tape cassette with said run of the tape therein being coincident with a recording medium transport path extending across said recess, means which, in a card mode of operation of the apparatus, is adapted to guide a card with said stripe forming the recording medium thereon in said transport path, and a pivoted cover movable between an opened position to permit the insertion and removal of the cassette and a closed position for enclosing said recess, said cover having a slidable portion movable between an extended position, at which it engages an adjacent edge of said recess to complete the closing thereof, and a retracted position at which the slidable cover portion is spaced from said adjacent edge of the recess to guide the card therebetween;

a rotatable capstan extending into said recess adjacent said transport path;

a head carriage mounted in said housing for reciprocal movements in directions normal to said transport path between operative and inoperative positions;

magnetic head means on said carriage engageable with the magnetic recording medium in said transport path when said carriage is in said operative position;

pinch roller means cooperating with said capstan, upon movement of said head carriage to said operative position thereof, for driving the tape or card therebetween along said transport path;

a tape guide member urged to project into said transport path for guiding the tape in such path adjacent said head means in response to movement of said carriage to said operative position in said cassette mode of operation; and mode change-over means selectively actuable to first and second positions for establishing said cassette mode of operation and said card mode of operation, respectively, said mode change-over means including means blocking the projection of said tape guide member into said transport path when said carriage is moved to its operative position in said card mode of operation.

3. Apparatus according to claim 2; in which said mode change-over means includes latch means operative in said card mode of operation for locking said pivoted cover in said closed position.

4. Apparatus according to claim 2; in which said cover includes cassette holding means for slidably receiving the cassette when the cover is in said opened position.

5. An apparatus for recording and/or reproducing signals on a magnetic recording medium in the form of a tape contained in a tape cassette and being movable in a run along a side of the cassette, which cassette has indicating means selectively capable of first and second indications, or in the form of a stripe affixed to a card parallel to an edge portion thereof, said apparatus comprising:

a housing having a recess which, in a cassette mode of operation of the apparatus, is adapted to receive the tape cassette with said run of the tape therein being coincident with a recording medium transport path extending across said recess, and means which, in a card mode of operation of the apparatus, is adapted to guide a card with said stripe forming the recording medium thereon in said transport path;

a rotatable capstan extending into said recess adjacent said transport path;

a head carriage mounted in said housing for reciprocal movements in directions normal to said transport path between operative and inoperative positions;

magnetic head means on said carriage engageable with the magnetic recording medium in said transport path when said carriage is in said operative position;

pinch roller means cooperating with said capstan, upon movement of said head carriage to said operative position thereof, for driving the tape or card therebetween along said transport path;

a tape guide member urged to project into said transport path for guiding the tape in such path adjacent said head means in response to movement of said carriage to said operative position in said cassette mode of operation;

mode change-over means selectively actuable to first and second positions for establishing said cassette mode of operation and said card mode of operation, respectively, said mode change-over means including means blocking the projection of said tape guide member into said transport path when said carriage is moved to its operative position in said card mode of operation;

means selectively actuable for obtaining recording and reproducing operations, respectively;

record prevent means to prevent said recording operation in said cassette mode of operation in response to said second indication of the indicating means of the cassette in said recess; and means responsive to the actuation of said mode change-over means to said second position thereof for rendering said record prevent means ineffective in said card mode of operation.

6. Apparatus according to claim 5; in which said indicating means of the cassette is constituted by at least one aperture normally obstructed by an element which is removable therefrom to provide said first and second indications by the presence and absence, respectively, of the element in the aperture; said record prevent means is urged to a record-prevent position and is blocked from movement to said record-prevent position by the presence of said element obstructing the aperture of the cassette in said recess when the cassette mode of operation is selected; and said means for rendering the record prevent means ineffective includes a slide member movable to an operative position in response to the actuation of said mode change-over means to said second position thereof for selecting the card mode of operation, with said slide member having a lug which, in said operative position of the slide member, is disposed to block the movement of said record-prevent means to said record-prevent position.

7. Apparatus according to claim 6; in which said housing includes a pivoted cover movable between an opened position to permit the insertion and removal of the cassette and a closed position for enclosing said recess, said cover has a slidable portion movable between an extended position in which it is engageable with an adjacent edge of said recess to complete the closing thereof and a retracted position in which the slidable cover portion is spaced from said adjacent edge of the recess to guide the card therebetween, and said slide member has a latch element thereon which, in said operative position of the slide member, locks said pivoted cover in said closed position of the latter.

8. An apparatus for recording and/or reproducing signals on a magnetic recording medium in the form of a tape contained in a tape cassette and being movable in a run along a side of the cassette, or in the form of a stripe affixed to a card parallel to an edge portion thereof, said apparatus comprising:

a housing having a recess which, in a cassette mode of operation of the apparatus, is adapted to receive the tape cassette with said run of the tape therein being coincident with a recording medium transport path extending across said recess, and means which, in a card mode of operation of the apparatus, is adapted to guide a card with said stripe forming the recording medium thereon in said transport path;

a rotatable capstan extending into said recess adjacent said transport path;

a head carriage mounted in said housing for reciprocal movements in directions normal to said transport path between operative and inoperative positions;

magnetic head means including a recording and reproducing head fixed on said carriage and having a face directed toward said path so as to be engageable against the tape or stripe constituting the magnetic recording medium in the cassette or card mode of operation upon movement of the carriage to said operative position thereof;

a tape guide member mounted on said carriage for limited movement relative to the latter in said directions normal to the transport path and including tape guide fingers adapted to extend beyond said face of the head for positioning the tape relative to said face;

spring means urging said tape guide member relative to said carriage in the direction for extending said tape guide fingers beyond said face and thereby guiding the tape in said path adjacent said head in response to movement of said carriage to said operative position in said cassette mode of operation;

pinch roller means cooperating with said capstan, upon movement of said head carriage to said operative position thereof, for driving the tape or card therebetween along said transport path; and mode change-over means selectively actuable to first and second positions for establishing said cassette mode of operation and said card mode of operation, respectively, said mode change-over means including a slide member movable generally parallel to said transport path and having a portion which, in said second position of the mode change-over means for selecting the card mode of operation, is engageable by said tape guide member to block the movement of the latter by said spring means with said carriage when the latter is moved to its operative position.

9. Apparatus according to claim 8; in which said mode change-over means further includes a manually actuable pivoted change-over lever engageable by said slide member for positioning the latter in response to pivoting of said change-over lever, a support arm pivotally mounted for movement with said change-over lever, and a back-up roller on said support arm which, in said first position of the mode change-over means, is offset in respect to said recording and reproducing head and disposed out of said recess, said back-up roller being displaced, in said second position of the mode change-over means, so as to confront said face of the head at the other side of said transport path so as to press said stripe of the card against said face of the head.

10. Apparatus according to claim 9; in which the cassette has at least one aperture normally obstructed by an element which is removable therefrom to provide first and second indications by the presence and absence, respectively, of the element in the aperture; and further comprising means selectively actuable for obtaining recording and reproducing operations, respectively, record prevent means urged to a record-prevent position to prevent the recording operation in the cassette mode of operation in response to said second indication by the cassette in said recess, said record prevent means being blocked from movement to said record-prevent position by the presence of said element obstructing the aperture of the cassette in said recess when the cassette mode of operation is selected, and a second slide member movable generally normal to said transport path and being engageable by said change-over lever so as to be moved to an operative position in response to actuation of the mode change-over means to said second position thereof, said second slide member having a lug thereon which, in said operative position of the second slide member, is disposed to block the movement of said record prevent means to said record-prevent position.

11. Apparatus according to claim 10, in which said housing includes a pivoted cover movable between an opened position to permit the insertion and removal of the cassette and a closed position for enclosing the recess, said cover has a slidable portion movable between an extended position in which it is engageable with an adjacent edge of said recess to complete the closing thereof and a retracted position in which the slidable cover portion is spaced from said adjacent edge of the recess to guide the card therebetween, and said second slide member has a latch element thereon which, in said operative position of the second slide member, locks said pivoted cover in said closed position of the latter.

* * * * *